(12) United States Patent
Ray et al.

(10) Patent No.: US 10,398,084 B2
(45) Date of Patent: Sep. 3, 2019

(54) SYSTEM AND METHOD FOR SPEED-BASED COORDINATED CONTROL OF AGRICULTURAL VEHICLES

(71) Applicants: CNH Industrial America LLC, New Holland, PA (US); Autonomous Solutions, Inc., Mendon, UT (US)

(72) Inventors: Brian Robert Ray, Chicago, IL (US); Peter John Dix, Naperville, IL (US); Daniel John Morwood, Amalga, UT (US); Michael G. Hornberger, Weston, ID (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 161 days.

(21) Appl. No.: 15/400,406

(22) Filed: Jan. 6, 2017

(65) Prior Publication Data

US 2017/0192419 A1    Jul. 6, 2017

Related U.S. Application Data

(60) Provisional application No. 62/275,663, filed on Jan. 6, 2016.

(51) Int. Cl.
*G05D 1/02* (2006.01)
*A01D 43/07* (2006.01)

(52) U.S. Cl.
CPC .......... *A01D 43/07* (2013.01); *G05D 1/0291* (2013.01); *G05D 2201/0201* (2013.01)

(58) Field of Classification Search
CPC ................. A01D 43/07; G05D 1/0291; G05D 2201/0201
See application file for complete search history.

(56) References Cited

U.S. PATENT DOCUMENTS 5,102,202 A  *  4/1992  Breen ....................... B60T 7/20
                                              188/112 R
5,494,344 A  *  2/1996  Heyn ...................... B60T 8/172
                                              303/140

(Continued)

FOREIGN PATENT DOCUMENTS

CN         101722954 A  *  6/2010  ............... B60D 1/36
WO         2014105927 A1      7/2014

(Continued)

*Primary Examiner* — Jean Paul Cass
(74) *Attorney, Agent, or Firm* — Rebecca L. Henkel; Rickard K. DeMille

(57) ABSTRACT

A control system for a haul vehicle, includes a first transceiver configured to receive a first signal from a second transceiver, wherein the first signal is indicative of a first determined position and a first determined velocity of the target vehicle. The control system includes a controller communicatively coupled to the first transceiver, wherein the controller automatically controls the speed of the haul vehicle by determining a desired position and a desired speed of the haul vehicle based at least in part on the first determined position and the first determined velocity of the target vehicle, instructing an automated speed control system to establish the ground speed of the haul vehicle to reach the target position, and instructing the automated speed control system to control the ground speed of the haul vehicle to maintain the target position, including during turning of the target and haul vehicles.

20 Claims, 6 Drawing Sheets

(56) References Cited

U.S. PATENT DOCUMENTS

| | | | | |
|---|---|---|---|---|
| 5,523,947 | A * | 6/1996 | Breen | B60T 8/1708 280/400 |
| 5,683,152 | A * | 11/1997 | Hu | B60T 8/1755 180/197 |
| 6,042,196 | A * | 3/2000 | Nakamura | B60T 7/12 188/112 R |
| 6,216,071 | B1 | 4/2001 | Motz | A01D 41/12 340/988 |
| 6,393,376 | B1 * | 5/2002 | Andreas | B60T 8/172 342/160 |
| 6,456,923 | B1 * | 9/2002 | Wolf | B60T 8/172 180/41 |
| 6,671,582 | B1 | 12/2003 | Hanley | |
| 6,682,416 | B2 * | 1/2004 | Behnke | A01B 69/008 141/231 |
| 6,687,616 | B1 * | 2/2004 | Peterson | A01B 79/005 702/5 |
| 6,732,024 | B2 * | 5/2004 | Wilhelm Rekow | A01B 69/008 340/901 |
| 7,219,067 | B1 * | 5/2007 | McMullen | B61L 27/0011 705/4 |
| 7,388,662 | B2 * | 6/2008 | Cantin | A01M 7/0096 356/338 |
| 7,440,831 | B2 * | 10/2008 | Miedema | A01B 69/008 56/10.2 R |
| 7,932,815 | B2 * | 4/2011 | Martinez | B60D 1/62 340/431 |
| 7,979,172 | B2 | 7/2011 | Breed | |
| 8,051,687 | B2 * | 11/2011 | De Carteret | B60T 8/175 180/6.2 |
| 8,125,529 | B2 | 2/2012 | Skoskiewicz et al. | |
| 8,224,078 | B2 * | 7/2012 | Boncyk | G06K 9/228 382/165 |
| 8,655,537 | B2 | 2/2014 | Ferguson et al. | |
| 9,326,444 | B2 * | 5/2016 | Bonefas | A01D 43/087 |
| 9,545,048 | B2 * | 1/2017 | Pickett | A01B 69/008 |
| 9,895,945 | B2 * | 2/2018 | Lavoie | B60T 7/20 |
| 9,908,377 | B2 * | 3/2018 | Allcorn | B60D 1/62 |
| 9,915,952 | B2 * | 3/2018 | Dollinger | A01B 69/008 |
| 2010/0070144 | A1 * | 3/2010 | Burke | A01D 41/1217 701/50 |
| 2012/0083982 | A1 | 4/2012 | Bonefas et al. | |
| 2012/0087771 | A1 | 4/2012 | Wenzel | |
| 2014/0039753 | A1 | 2/2014 | Smits et al. | |
| 2014/0046530 | A1 | 2/2014 | Humphrey | |
| 2014/0330479 | A1 | 11/2014 | Dolgov et al. | |
| 2014/0336881 | A1 | 11/2014 | Clar et al. | |
| 2015/0362922 | A1 * | 12/2015 | Dollinger | A01B 69/008 701/2 |
| 2016/0334798 | A1 * | 11/2016 | Foster | A01B 69/008 |
| 2017/0192419 | A1 * | 7/2017 | Ray | A01D 43/07 |
| 2017/0192431 | A1 * | 7/2017 | Foster | A01B 79/005 |

FOREIGN PATENT DOCUMENTS

| | | |
|---|---|---|
| WO | 2014105928 A1 | 7/2014 |
| WO | 2014105930 A1 | 7/2014 |

\* cited by examiner

SYSTEM AND METHOD FOR SPEED-BASED COORDINATED CONTROL OF AGRICULTURAL VEHICLES

CROSS REFERENCE TO RELATED APPLICATIONS

This application claims priority from and the benefit of U.S. Provisional Patent Application No. 62/275,663, entitled "SYSTEM AND METHOD FOR SPEED-BASED COORDINATED CONTROL OF AGRICULTURAL VEHICLES," filed Jan. 6, 2016, which is hereby incorporated by reference in its entirety.

BACKGROUND

The invention relates generally to a system and method for speed-based coordinated control of agricultural vehicles.

A harvester may be used to harvest agricultural crops, such as cotton, wheat, flax, or other crops. Generally, components (e.g., drums, spindles, blades, etc.) of the harvester remove portions of the agricultural crops from the ground. The harvester typically then conveys the removed portions of the agricultural crops (e.g., agricultural products) to an internal storage compartment, either directly or via a processing device configured to remove undesirable portions of the products.

As the harvester traverses a field, the volume of the agricultural product stored within the internal storage compartment increases. Accordingly, the internal storage compartment is typically unloaded multiple times during the harvesting process. One method of unloading the internal storage compartment, generally known as unloading on-the-go, involves periodically transferring the product to a mobile storage compartment while the harvester is in motion. The mobile storage compartment is towed by a haul vehicle to a position proximate to the harvester. The operator of the haul vehicle aligns the storage compartment with a conveyor outlet of the harvester and substantially matches the speed of the harvester. The harvester operator then initiates transfer of the agricultural product from the harvester to the mobile storage compartment, thereby at least partially unloading the internal storage compartment of the harvester. Once the harvester is unloaded or the haul vehicle is full, the haul vehicle operator directs the mobile storage compartment to a remote location for offloading. This process repeats throughout the harvesting process.

Highly skilled drivers typically operate the haul vehicles due to the complexity associated with aligning the mobile storage compartment with the harvester and matching the speed of the harvester. Employing such drivers may increase the costs associated with the harvesting process and/or may delay the harvesting process due to the limited availability of these drivers. Furthermore, employing less skilled drivers to operate the haul vehicles may result in product loss by spillage due to misalignment of the mobile storage compartment with the harvester and/or mismatched operating speeds. As a result, the efficiency of the harvesting process may be reduced.

BRIEF DESCRIPTION

In one embodiment, a control system for a haul vehicle, includes a first transceiver configured to receive a first signal from a second transceiver, wherein the first signal is indicative of a first determined position and a first determined velocity of the target vehicle. The control system includes a controller communicatively coupled to the first transceiver, wherein the controller automatically controls the speed of the haul vehicle by determining a target position and a target speed of the haul vehicle based at least in part on the first determined position and the first determined velocity of the target vehicle, instructing an automated speed control system to establish the ground speed of the haul vehicle to reach the target position, and instructing the automated speed control system to control the ground speed of the haul vehicle to maintain the target position.

In another embodiment, a control system for an agricultural vehicle, includes a first transceiver configured to receive a first signal from a second transceiver, where the first signal is indicative of a first determined position and a first determined velocity of the target vehicle. The control system includes a spatial locating device mounted on the haul vehicle and configured to determine a second determined position and a second determined velocity of the target vehicle, an automated speed control system configured to control a speed of the haul vehicle, and a controller communicatively coupled to the first transceiver, to the spatial locating device, and to the automated speed control system. The controller automatically controls the speed of the haul vehicle by determining a target position and a target speed of the haul vehicle based at least in part on the first determined position and the first determined velocity of the target vehicle, automatically controlling a separation distance between the haul vehicle and the target vehicle by determining the target position of the haul vehicle based at least in part on a first radius of curvature of the target vehicle and a second radius of curvature of a haul vehicle, determining a route to the target position based at least in part on the target position, the separation distance, the second determined position, and the second determined velocity, instructing the automated speed control system to direct the haul vehicle toward the target position along a route, and instructing the automated speed control system to substantially maintain the target position and the target velocity.

In a further embodiment, a method for controlling a haul vehicle, including receiving a first signal indicative of a first determined position and a first determined velocity of a target vehicle, determining a target position and a target speed of the haul vehicle based at least in part on the first determined position and the first determined velocity of the target vehicle, instructing an automated speed control system to establish a ground speed of the haul vehicle sufficient to reach the target position, and instructing the automated speed control system to control the ground speed of the haul vehicle to maintain the target position upon substantially reaching the target position.

DRAWINGS

These and other features, aspects, and advantages of the present invention will become better understood when the following detailed description is read with reference to the accompanying drawings in which like characters represent like parts throughout the drawings, wherein.

Figure 1:
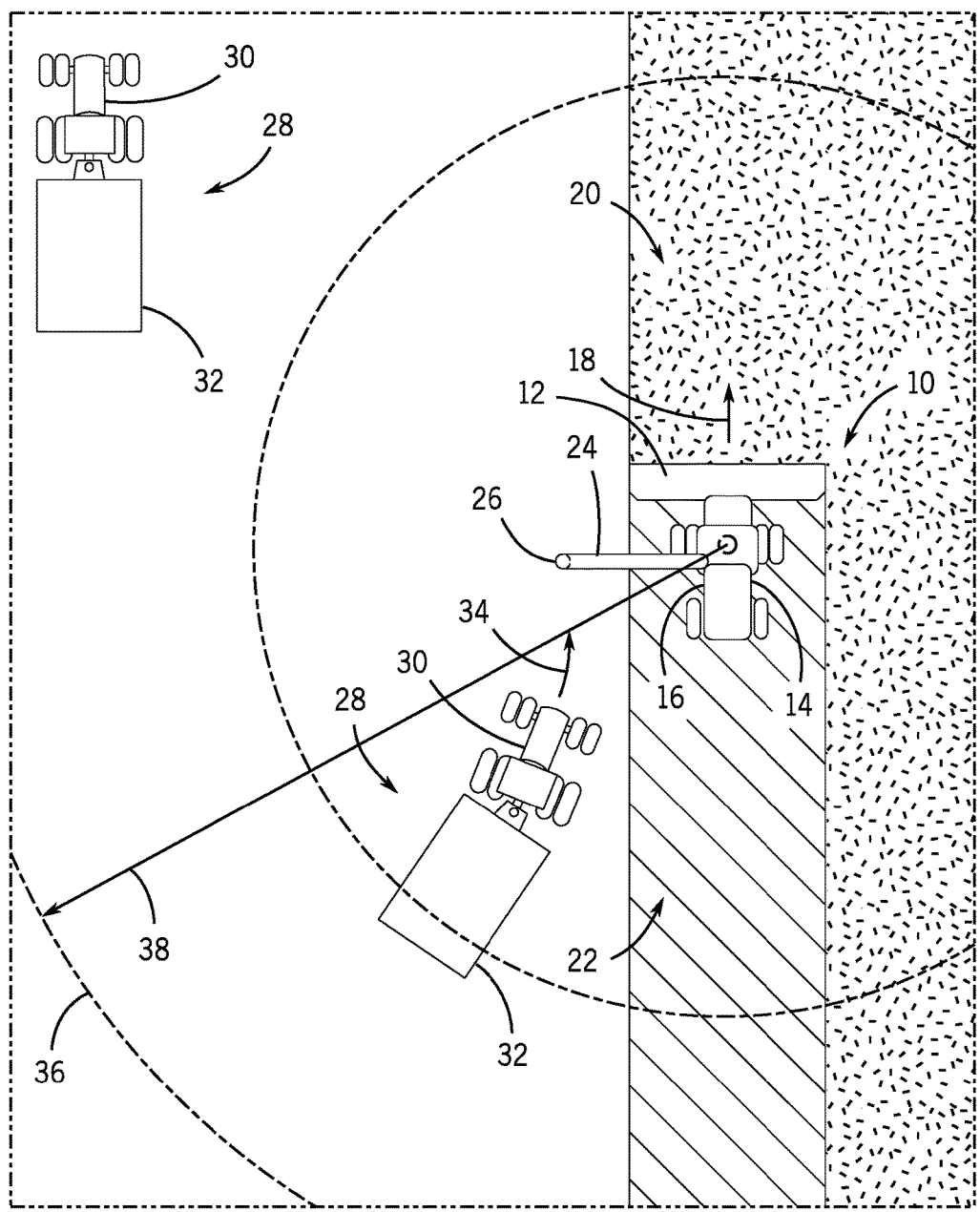
FIG. 1 is a plan view of an embodiment of an agricultural harvester and an agricultural product transportation system, in which the agricultural product transportation system is configured to be automatically controlled by an automatic speed control system to establish and maintain alignment with the agricultural harvester.
Figure 4:
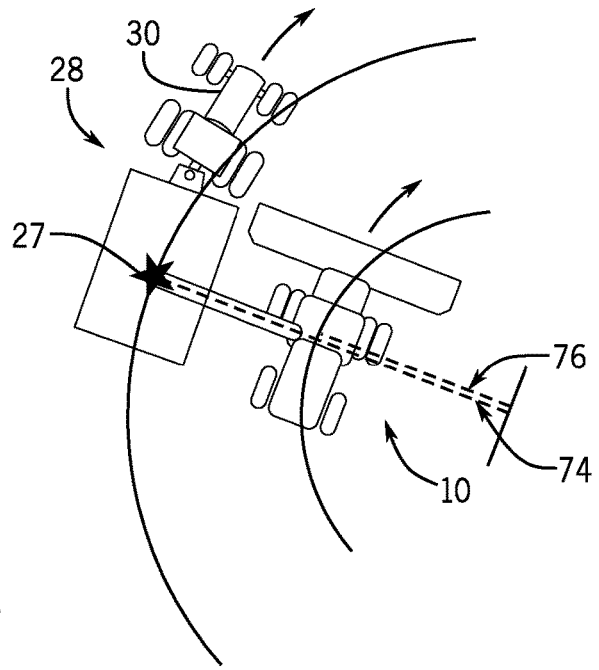
Figure 5:
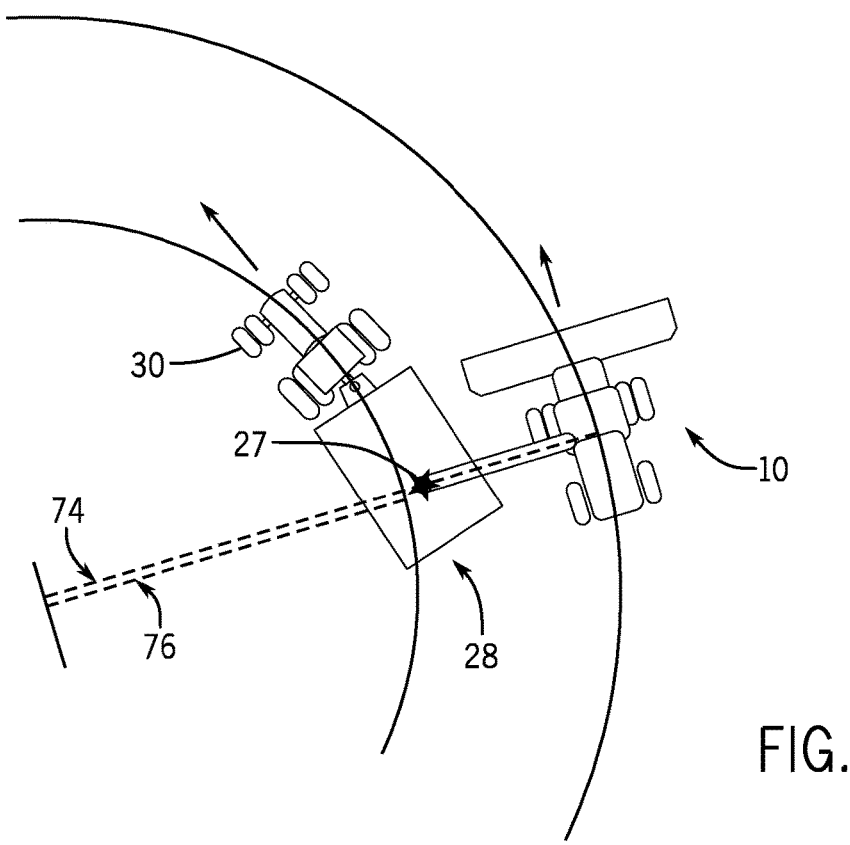
Figure 6:
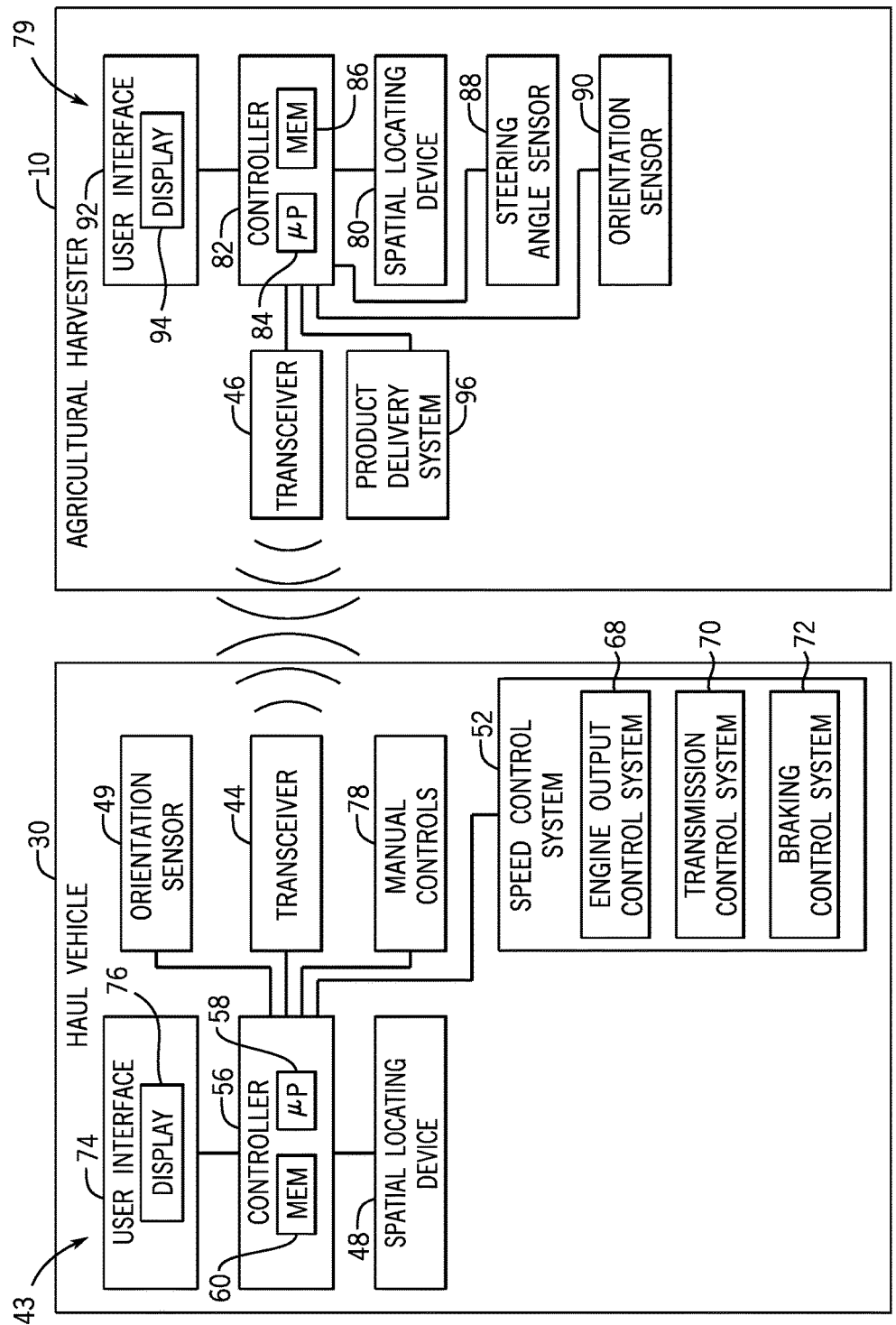
Figure 7:
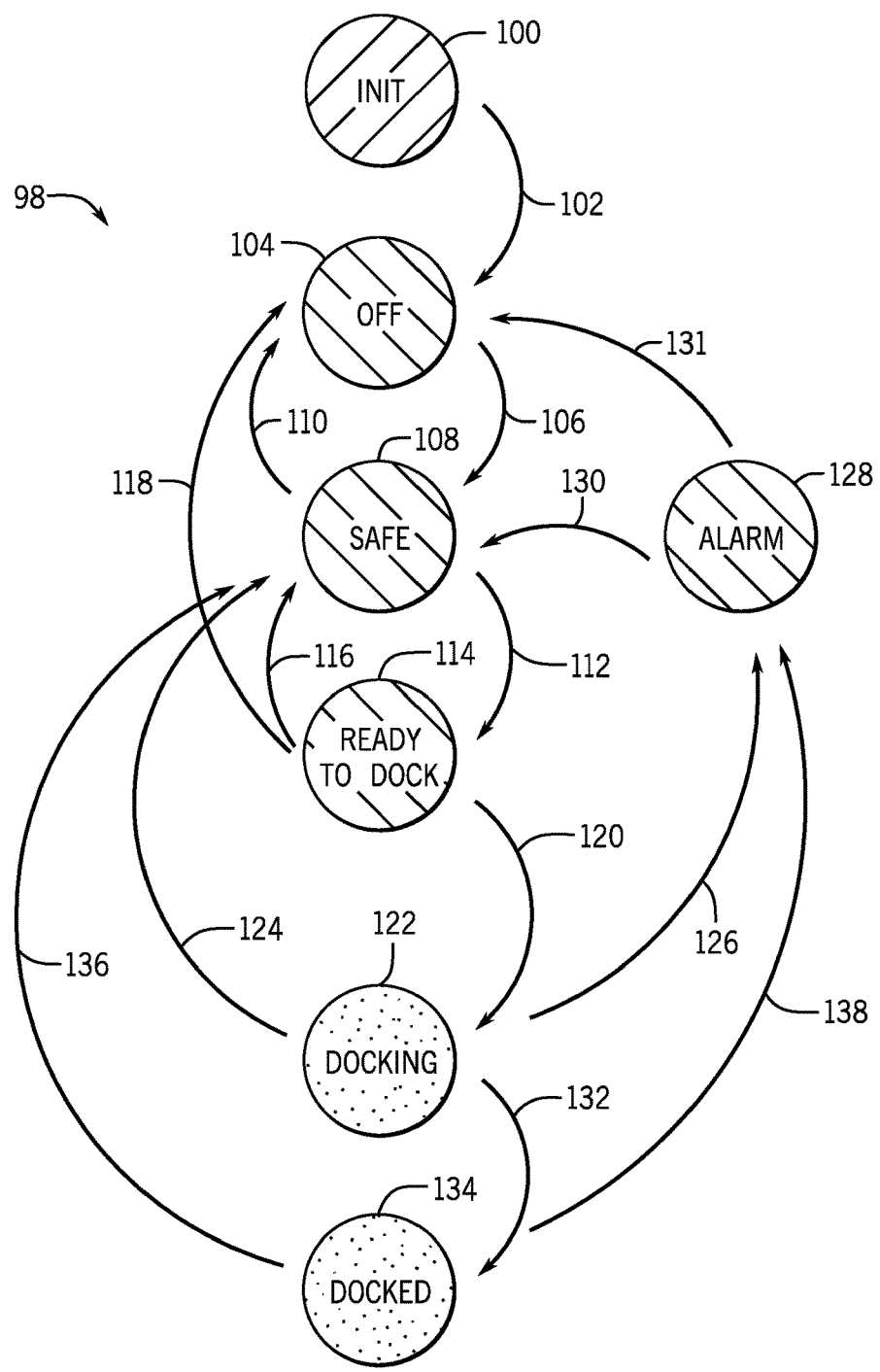
Figure 8:
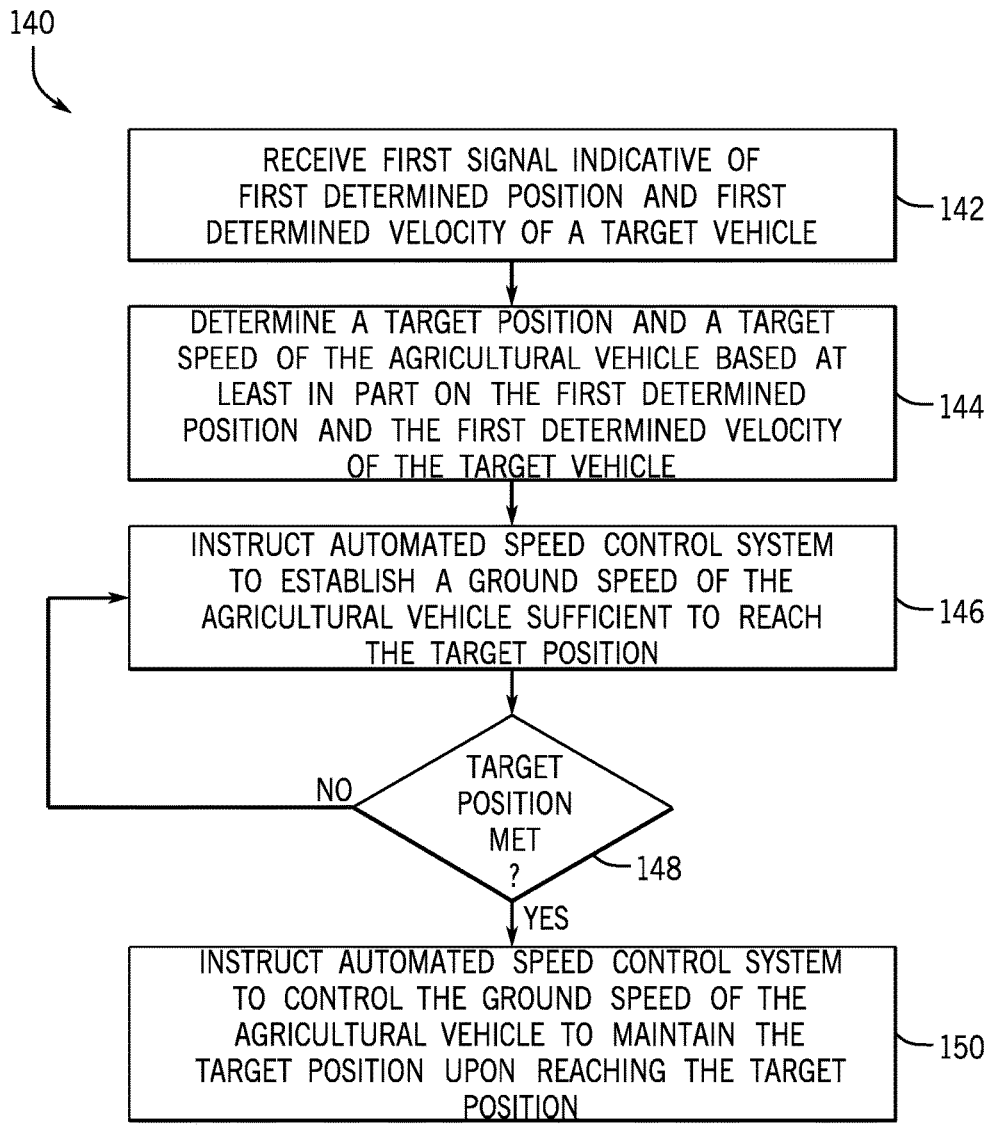

FIG. 4 is a plan view of the agricultural harvester and the agricultural product transportation system of FIG. 1, in which the automated speed control system is configured to automatically control the speed of the agricultural product transportation system such that it maintains a position relative to the agricultural harvester while remaining positioned outward from the agricultural harvester during a turn;

FIG. 5 is a plan view of the agricultural harvester and the agricultural product transportation system of FIG. 1, in which the automated speed control system is configured to automatically control the speed of the agricultural product transportation system such that it maintains a position relative to the agricultural harvester while remaining positioned inward from the agricultural harvester during a turn;

FIG. 6 is a schematic diagram of an embodiment of an agricultural harvester and a haul vehicle of an agricultural product transportation system;

FIG. 7 is a state diagram of an embodiment of an exemplary technique for controlling a haul vehicle of an agricultural product transportation system; and FIG. 8 is a flow diagram of an embodiment of an exemplary method for controlling an agricultural product transportation system.

DETAILED DESCRIPTION

FIG. 1 is a plan view of an embodiment of an agricultural harvester 10 and an agricultural product transportation system 28, in which the agricultural product transportation system 28 is configured to be automatically controlled by an automatic speed control system to establish and maintain alignment with the agricultural harvester. In the illustrated embodiment, the agricultural harvester 10 includes a row of harvesting units 12 positioned on a front end of a chassis 14, and an internal storage compartment 16 coupled to the chassis 14. As the agricultural harvester 10 traverses a field in a direction of travel 18, the harvesting units 12 engage unharvested plants 20 and extract various agricultural products (e.g., corn, wheat, cotton, etc.) from the plants. These agricultural products are transferred to the internal storage compartment 16, either directly or via a processing device configured to remove undesirable portions of the products. The remaining portions of the plants may remain in the field as agricultural residue 22.

As the harvester 10 traverses the field, the volume of the agricultural product stored within the internal storage compartment 16 increases. Accordingly, the harvester 10 includes a conveyor 24 configured to transfer the agricultural product to a mobile storage compartment (e.g., of the agricultural transportation system 28) while the harvester is in motion. The conveyor 24 may include an auger, a conveyor belt, or other suitable device configured to transfer the agricultural product from the internal storage compartment 16 to an outlet 26. As discussed in detail below, the mobile storage compartment may be automatically aligned with the conveyor outlet 26 (e.g., by automatically controlling the speed of the agricultural transportation system), thereby enhancing the efficiency of the harvester unloading process.

While the illustrated agricultural harvester 10 is a self-propelled vehicle, it should be appreciated that, in certain embodiments, the agricultural harvester 10 may be towed behind a tractor or other work vehicle. In addition, while the illustrated agricultural harvester 10 includes an internal storage compartment 16, it should be appreciated that the internal storage compartment may be omitted in certain harvester configurations. In such configurations, the harvester may continuously transfer agricultural product to the mobile storage compartment as the harvester extracts and processes the agricultural products.

In the illustrated embodiment, an agricultural product transportation system 28 is configured to receive the agricultural product from the harvester 10. As illustrated, the product transportation system 28 includes a haul vehicle 30, such as the illustrated tractor, and a mobile storage compartment 32 (e.g., grain cart). As discussed in detail below, the haul vehicle 30 includes a controller configured to automatically control the speed of the agricultural transportation system 28 as the haul vehicle 30 moves along a route 34 to a target position adjacent to the harvester 10. That is, the controller (e.g., via an automated speed control system) may automatically control the speed of the haul vehicle 30 during a docking process, thereby facilitating alignment of the storage compartment with the outlet 26 of the conveyor 24. In certain embodiments, the controller is configured to determine a target speed of the haul vehicle 30 based at least in part on a determined position and a determined velocity of the harvester 10. Once the haul vehicle 30 substantially reaches a target position (e.g., with outlet 26 aligned with the mobile storage compartment 32), the controller is configured to instruct the automated speed control system to substantially maintain the target position by controlling the speed of the haul vehicle. For example, when the agricultural vehicle turns, the controller is configured to calculate a first radius of curvature of the harvester and a second radius of curvature of the agricultural transportation system 28. The speed of the haul vehicle may be adjusted based at least in part of the first radius of curvature and the second radius of curvature. Furthermore, a driver or an automated system may maintain a separation distance between the harvester 10 and product transportation system 28 to align the outlet 26 with the mobile storage compartment.

In certain embodiments, the target position corresponds to a position that substantially aligns the conveyor outlet 26 with a target point on the storage compartment 32. Accordingly, with the haul vehicle 30 located at the target position, the agricultural product may be transferred from the harvester 10 to the storage compartment 32 while the vehicles are in motion. Automatically maintaining the speed of the storage compartment relative to the conveyor outlet during the unloading process may facilitate positioning the haul vehicle 30 at the target point 27 (e.g., via operator steering or an automated steering system). As a result, the possibility of agricultural product loss is substantially reduced or eliminated, thereby increasing the efficiency of the harvesting process.

By way of example, when the haul vehicle 30 enters an area of communication 36, communication is automatically established between a first transceiver on the target vehicle 10 and a second transceiver on the haul vehicle 30. As will be appreciated, a range 38 of the area of communication 36 may be dependent on the broadcast power of the transceivers, the sensitivity of the transceivers, and/or the communication frequency, among other factors. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). As discussed in detail below, the data may include a position of the vehicle, a velocity of the vehicle, a moment of inertia of the vehicle, a steering angle of the vehicle, an orientation of the vehicle, and/or an identity of the vehicle, among other parameters. In addition, each transceiver may be configured to retransmit data received from another transceiver. For example, the haul vehicle closer to the harvester may receive a signal from the harvester, and then retransmit the signal to the haul vehicle 30 farther from the harvester, thereby effectively extending the communication range of each transceiver.

To initiate the docking process, an operator of the haul vehicle 30 provides input to a user interface, thereby instructing the controller to enable automatic speed control of the haul vehicle 30. For example, if the harvester 10 is positioned in front of the haul vehicle 30, the automated speed control system may increase the speed of the haul vehicle 30. Conversely, if the harvester is positioned behind the haul vehicle 30, the automated speed control system may stop the haul vehicle 30 until the harvester reaches a docking position. In certain embodiments, the steering control system may adjust wheel angles, for example, to steer the haul vehicle 30 toward the harvester. The speed control system also calculates the first radius of curvature of the target vehicle 10 and the second radius of curvature of the haul vehicle 30 to control the speed of the haul vehicle 30 as needed when the harvester 10 (e.g., target vehicle) and the haul vehicle 30 are traveling in a curved path. Once the haul vehicle 30 substantially reaches the target position, the controller instructs the automated speed control system to substantially maintain the target position and the target velocity, thereby facilitating transfer of agricultural product from the harvester 10 to the storage compartment.

Figure 2:
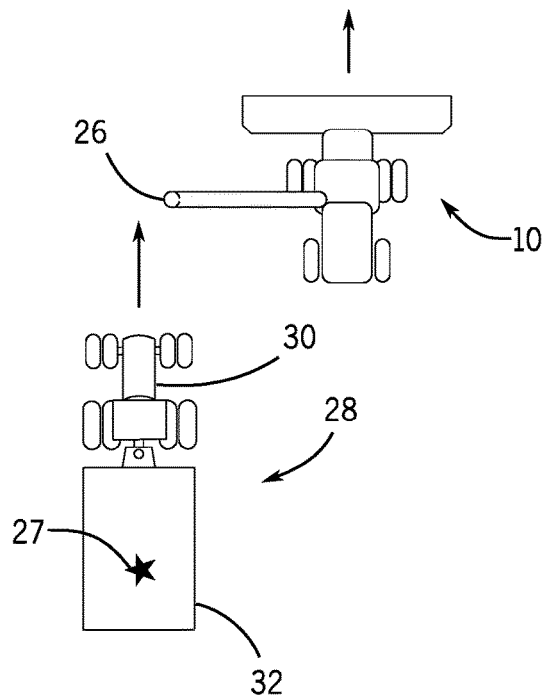
FIG. 2 is a plan view of the agricultural harvester and the agricultural product transportation system shown in FIG. 1, in which the automated speed control system is configured to automatically increase the speed of the agricultural product transportation system to establish alignment with the agricultural harvester.

FIG. 2 is a plan view of the agricultural harvester 10 and the agricultural product transportation system 28 of FIG. 1, in which the automated speed control system is configured to automatically increase the speed of the agricultural product transportation system 28 to establish alignment with the agricultural harvester 10. The controller is configured to receive a first signal from a first transceiver of the target vehicle. The controller is configured to determine the position of the target vehicle (e.g., harvester 10) based in part on the first signal.

The first signal may include a measurement of a position of the target vehicle, a speed of the target vehicle, a moment of inertia of the target vehicle, a steering angle of the target vehicle, a heading angle of the target vehicle, a pitch angle of the target vehicle, a roll angle of the target vehicle, a yaw angle of the target vehicle, or a combination of these measurements. The controller is configured to adjust the speed of the haul vehicle 30 based on one or more of these measurements. In order to align the conveyor outlet 26 with a target point 27 of the storage compartment 32, the controller determines a first position of the target vehicle (e.g., harvester 10) and a second position of the haul vehicle 30. In the illustrated embodiment, the haul vehicle is laterally and longitudinally offset from the target vehicle and trails the target vehicle by a separation distance. To reach the target position (e.g., the conveyor outlet 26 aligned with the target point 27 of the storage compartment 32), the controller controls the speed of the haul vehicle 30, such that haul vehicle 30 travels at a speed greater than the target vehicle 10 to catch up to the target vehicle 10. Once the target position is reached, the controller is configured to control the speed of the haul vehicle 30 to match the speed of the target vehicle 10.

Figure 3:
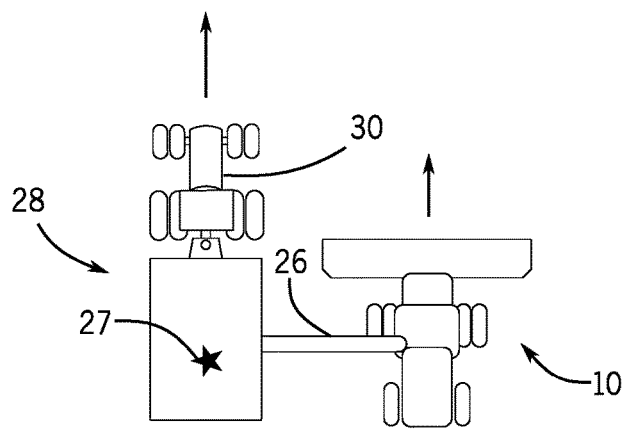
FIG. 3 is a plan view of the agricultural harvester and the agricultural product transportation system of FIG. 1, in which the automated speed control system is configured to automatically control the speed of the agricultural product transportation system to match the speed of the agricultural harvester.

FIG. 3 is a plan view of the agricultural harvester 10 and the agricultural product transportation system 28, in which the automated speed control system is configured to automatically control the speed of the agricultural product transportation system 28 to match the speed of the agricultural harvester 10. In the illustrated embodiment, the haul vehicle 30 is laterally offset and longitudinally aligned with the target vehicle 30 (e.g., linear separation and movement). The controller is configured to determine the first speed of the target vehicle 10 and to determine the second speed of the haul vehicle 30. The controller receives the first signal to monitor the position of the target vehicle, the speed of the target vehicle, the moment of inertia of the target vehicle, the steering angle of the target vehicle, the heading angle of the target vehicle, the pitch angle of the target vehicle, the roll angle of the target vehicle, the yaw angle of the target vehicle, or a combination of these parameters. If the second speed of the haul vehicle varies from the first speed of the target vehicle 10 by more than an acceptable range (e.g., threshold range), the controller is configured to adjust the speed of the haul vehicle 30 to match the speed of the target vehicle 10. In some embodiments, the controller is configured to adjust the longitudinal separation distance between the haul vehicle 30 and the target vehicle 10. The movement of the haul vehicle 30 and the target vehicle 10 may be further understood with respect to the description associated with FIGS. 4-5, which discuss non-linear translation of the haul vehicle and the target vehicle.

FIG. 4 is a plan view of an embodiment of the agricultural harvester 10 and the agricultural product transportation system 28 of FIG. 1, in which the automated speed control system is configured to automatically control the speed of the agricultural product transportation system 28 such that the agricultural product transportation system maintains a position relative to the agricultural harvester 10 while the agricultural product transportation system is positioned outward from the agricultural harvester during a turn. In the illustrated embodiment, the haul vehicle 30 includes an automated speed control system. The automatic speed control system on the haul vehicle 30 is configured to account for the curved path of the target vehicle and the haul vehicle while controlling the speed of the haul vehicle. As described in detail below, the automatic speed control system is configured to calculate a first radius of curvature 74 of the target vehicle 10 and a second radius of curvature 76 of the agricultural product transportation system 28 (e.g., target point 27 of the storage compartment 32) based on the position, the speed, the moment of inertia, the steering angle, the heading angle, the pitch angle, the roll angle, the yaw angle, or a combination of these parameters. The automatic speed control system commands a greater speed of the haul vehicle 30 when the haul vehicle 30 has a greater radius of curvature than the harvester 10. In the illustrated embodiment, the automatic speed control system is configured to determine the second radius of curvature 76 of the haul vehicle 30 (e.g., target point 27 of the storage compartment 32) and the first radius of curvature 74 of the harvester 10 based on parameters described above. Next, the automatic speed control system determines the speed of the haul vehicle 30 based on the speed of the harvester 10 and the first radius of curvature of the haul vehicle 30. As the haul vehicle 30 and the agricultural harvester 10 move along their respective paths, the automatic speed control system automatically adjusts the speed of the agricultural product transportation system 28 to maintain the desired alignment.

FIG. 5 is a plan view of an embodiment of the agricultural harvester 10 and the agricultural product transportation system 28 of FIG. 1, in which the automated speed control system is configured to automatically control the speed of the agricultural product transportation system 28 such that the agricultural product transportation system maintains a position relative to the agricultural harvester 10 while the agricultural product transportation system is positioned inward relative to the agricultural harvester during a turn. In the illustrated embodiment, the haul vehicle 30 includes an automated speed control system. The automatic speed control system on the haul vehicle 30 is configured to account for the curved path of the target vehicle 10 and the haul vehicle 30 while controlling the speed of the haul vehicle. As described above, the automatic speed control system is configured to calculate a first radius of curvature 74 of the target vehicle 10 and a second radius of curvature 76 of agricultural product transportation system 28 (e.g., target point 27 of the storage compartment 32) based on the position, the speed, the moment of inertia, the steering angle, the heading angle, the pitch angle, the roll angle, the yaw angle, or a combination of these parameters. The automatic speed control system commands a lesser speed of the haul vehicle 30 when the haul vehicle 30 has a smaller radius of curvature than the agricultural harvester 10. In the illustrated embodiment, the automatic speed control system is configured to determine the second radius of curvature 76 of the haul vehicle 30 (e.g., target point 27 of the storage compartment 32) and the first radius of curvature 74 of the harvester 10 based on parameters described above. Next, the automatic speed control system determines the speed of the haul vehicle 30 based on the speed of the harvester and the radius of curvature of the haul vehicle 30. As the haul vehicle 30 and the agricultural harvester 10 move along their respective paths, the automatic speed control system automatically adjusts the speed of the agricultural product transportation system 28 to maintain the desired alignment.

FIG. 6 is a schematic diagram of an embodiment of an agricultural harvester 10 and a haul vehicle 30 of the agricultural product transportation system. In the illustrated embodiment, the haul vehicle 30 includes a control system 43 having a first transceiver 44 configured to receive a first signal from a second transceiver 46 of a target vehicle, such as the illustrated agricultural harvester 10. As discussed in detail below, the first signal is indicative of a first determined position (e.g., three-dimensional position vector) and a first determined velocity (e.g., three-dimensional velocity vector) of the harvester 10. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation. As will be appreciated, the position vector may be represented in a rectangular, polar, cylindrical, or spherical coordinate system, among other suitable coordinate systems. In addition, as used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. Similar to the position vector, the velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space. For some calculations, speed alone (a scalar quality) may be used.

The haul vehicle control system 43 also includes a spatial locating device 48, which is mounted to the haul vehicle 30 and configured to determine a second determined position and a second determined velocity of the haul vehicle 30. As will be appreciated, the spatial locating device may include any suitable system configured to measure the position and velocity of the haul vehicle 30, such as a global positioning system (GPS), for example. In certain embodiments, the spatial locating device 48 may be configured to measure the position and velocity of the haul vehicle 30 relative to a fixed point within a field (e.g., via a fixed radio transceiver). Accordingly, the spatial locating device 48 may be configured to measure the position and velocity of the haul vehicle 30 relative to a fixed global coordinate system (e.g., via the GPS) or a fixed local coordinate system. In certain embodiments, the first transceiver 44 is configured to broadcast a second signal indicative of the second determined position and/or the second determined velocity to other vehicles within the area of communication.

In addition, the haul vehicle control system 43 includes an orientation sensor 49 configured to determine a pitch angle, a yaw angle, and/or a roll angle of the haul vehicle 30. For example, the orientation senor 49 may include a gyroscope, an accelerometer, or other sensor configured to monitor the orientation of the haul vehicle 30. In certain embodiments, the orientation sensor 49 is also configured to determine a pitch rate, a yaw rate, and/or a roll rate. Furthermore, in certain embodiments, the haul vehicle control system 43 is configured to compare the orientation (e.g., pitch angle, yaw angle, and/or roll angle) of the haul vehicle 30 to a measured orientation (e.g., pitch angle, yaw angle, and/or roll angle) of the harvester 10 to establish a relative orientation that may be utilized to enhance the accuracy of the speed determination process.

In the illustrated embodiment, the control system 43 includes an automated speed control system 52 configured to control a speed of the haul vehicle 30. In addition, the control system 43 includes a controller 56 communicatively coupled to the first transceiver 44, to the spatial locating device 48, and to the automated speed control system 52. The controller 56 is configured to automatically control the speed of the haul vehicle 30 during docking and while docked with the harvester, thereby facilitating alignment of the output port of the conveyor with the mobile storage compartment. Upon substantially reaching the target position, the controller is configured to instruct the automated speed control system 52 to control the speed of the haul vehicle such that the target position is maintained (e.g. in combination with steering control from an operator or automated steering control system).

In certain embodiments, the controller 56 is an electronic controller having electrical circuitry configured to process data from the transceiver 44, the spatial locating device 48, and/or other components of the control system 43. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the speed of the haul vehicle 30, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as ROM. The memory device 60 may store a variety of information and may be used for various purposes. For example, the memory device 60 may store processor-executable instructions (e.g., firmware or software) for the processor 58 to execute, such as instructions for controlling the speed of the haul vehicle 30. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, identification data, etc.), instructions (e.g., software or firmware for controlling the speed of the haul vehicle, etc.), and any other suitable data.

In the illustrated embodiment, the automated speed control system 52 includes an engine output control system 68, a transmission control system 70, and a braking control system 72. The engine output control system 68 is configured to vary the output of the engine to control the speed of the haul vehicle 30. For example, the engine output control system 68 may vary a throttle setting of the engine, a fuel/air mixture of the engine, a timing of the engine, and/or other suitable engine parameters to control engine output. In addition, the transmission control system 70 may adjust gear selection within a transmission to control the speed of the haul vehicle 30. Furthermore, the braking control system 72 may adjust braking force, thereby controlling the speed of the haul vehicle 30. While the illustrated automated speed control system 52 includes the engine output control system 68, the transmission control system 70, and the braking control system 72, it should be appreciated that alternative embodiments may include one or two of these systems, in any suitable combination. Further embodiments may include an automated speed control system 52 having other and/or additional systems to facilitate adjusting the speed of the haul vehicle 30.

As illustrated, the haul vehicle 30 includes manual controls 78 configured to enable an operator to control the haul vehicle 30 while the automatic control system is disengaged. The manual controls 78 may include manual steering control (e.g., with or without automatic speed control), manual transmission control, and/or manual braking control, among other controls. In the illustrated embodiment, the manual controls 78 are communicatively coupled to the controller 56. The controller 56 is configured to disengage automatic control (e.g., speed, steering) of the haul vehicle 30 upon receiving a signal indicative of manual control of the haul vehicle 30. Accordingly, if an operator controls the haul vehicle 30 manually, the automatic docking/docked process terminates, thereby restoring control of the haul vehicle to the operator.

It should be noted that while reference is made here to a controller, or to various specialized controllers, in particular implementations, these are intended to relate more broadly to control circuitry, including one or more processors, memory devices, input and output circuits, and so forth. These may be combined into a single controller, or separated both physically and functionally. Where separated, they may be linked by any suitable network or communications link utilizing any desired protocol, such as CAN protocols.

In the illustrated embodiment, the harvester 10 includes a control system 79 having a spatial locating device 80, which is mounted to the harvester 10 and configured to determine the first determined position and the first determined velocity of the agricultural harvester 10. Similar to the haul vehicle spatial locating device 48, the harvester spatial locating device 80 may include any suitable system configured to measure the position and velocity of the harvester, such as a global positioning system (GPS), for example. In certain embodiments, the spatial locating device 80 may be configured to measure the position and velocity of the harvester relative to a fixed point within a field (e.g., via a fixed radio transceiver). Accordingly, the spatial locating device 80 may be configured to measure the position and velocity of the harvester relative to a fixed global coordinate system (e.g., via the GPS) or a fixed local coordinate system. As illustrated, the spatial locating device 80 is communicatively coupled to a controller 82 of the harvester control system 79. Similar to the haul vehicle controller 56, the harvester controller 82 includes a processor, such as the illustrated microprocessor 84, and a memory device 86. The controller 82 is communicatively coupled to the second transceiver 46 and configured to transmit position and velocity information from the spatial locating device 80 to the transceiver 46, thereby generating the first signal indicative of the first determined position and the first determined velocity of the agricultural harvester 10.

In the illustrated embodiment, the harvester control system 79 also includes a steering angle sensor 88 and an orientation sensor 90. The steering angle sensor 88 is configured to output a signal indicative of a measured and/or determined steering angle. For example, the steering angle sensor 88 may be configured to measure an angle of certain wheels (e.g., front wheels, rear wheels, etc.) relative to the chassis of the harvester. The steering angle sensor 88 may also be configured to measure differential braking forces (e.g., the braking force applied to each lateral side of the harvester). In addition, the steering angle sensor 88 may be configured to measure torque applied to each lateral side of the harvester (e.g., torque applied to a left wheel/track and torque applied to a right wheel/track). As illustrated, the steering angle sensor 88 is communicatively coupled to the controller 82. The controller 82 is configured to receive the signal indicative of steering angle from the sensor 88, and to transmit the signal to the transceiver 46. The transceiver 46, in turn, is configured to incorporate the steering angle information into the first signal to the haul vehicle 30. The steering angle information may enable the haul vehicle control system to more accurately predict the expected position of the harvester, thereby enhancing the efficiency of determining the radius of curvature of the harvester.

Furthermore, the orientation sensor 90 is configured to output a signal indicative of a measured pitch angle, a measured yaw angle, and/or a measured roll angle of the harvester. For example, the orientation senor 90 may include an accelerometer, a gyroscope, or other sensor configured to monitor the orientation of the harvester 10. In certain embodiments, the orientation sensor 90 is also configured to determine a pitch rate, a yaw rate, and/or a roll rate. As illustrated, the orientation sensor 90 is communicatively coupled to the controller 82. The controller 82 is configured to receive the signal indicative of the orientation measurements from the orientation sensor 90, and to transmit the signal to the transceiver 46. The transceiver 46, in turn, is configured to incorporate the orientation information into the first signal to the haul vehicle. The orientation information may enable the haul vehicle control system to more accurately predict the expected position of the harvester, thereby enhancing the efficiency of determining the radius of curvature of the harvester.

While the illustrated harvester control system includes a steering angle sensor 88 and an orientation sensor 90, it should be appreciated that one or both of these sensors may be omitted in certain embodiments. In addition, it should be appreciated that the harvester may include additional sensors configured to measure other parameters associated with operation of the harvester. For example, in certain embodiments, the harvester control system may include an electronic compass configured to output a signal indicative of heading. In further embodiments, the harvester control system may include an accelerometer configured to output a signal indicative of acceleration (e.g., three-dimensional acceleration) of the harvester. The output from such sensors may be incorporated within the first signal to the haul vehicle. For example, in certain embodiments, the heading information may be incorporated within the first determined velocity. The heading and/or acceleration information may enable the haul vehicle control system to more accurately predict the expected position of the harvester, thereby enhancing the efficiency of determining the radius of curvature of the harvester. While an electronic compass and an accelerometer are described above, it should be appreciated that, in further embodiments, the harvester control system may include other and/or additional sensors.

In the illustrated embodiment, the agricultural harvester 10 includes a product delivery system 96 configured to transfer agricultural product from the harvester to the storage compartment. As illustrated, the product delivery system 96 is communicatively coupled to the controller 82. In certain embodiments, the controller 82 is configured to automatically engage product flow from the conveyor outlet to the storage compartment (e.g., via activation of the product delivery system 96) while the conveyor outlet is within a threshold range of the target point.

FIG. 7 is a state diagram of an embodiment of an exemplary technique 98 for controlling a haul vehicle of an agricultural product transportation system. Prior to initiating the docking process, the control system is in an initialization state 100. As indicated by the arrow 102, booting the control system transitions the control system from the initialization state 100 to an "off" state 104. Switching the control system on, as indicated by the arrow 106 transitions the control system from the "off" state 104 to a "safe" state 108. Conversely, switching the control system off, as indicated by the arrow 110, transitions the control system to the "off" state 104. If no faults are detected within the system, as indicated by the arrow 112, the control system transitions to a "ready to dock" state 114. While in the "ready to dock" state, if a fault is detected, as indicated by the arrow 116, the control system transitions to the "safe" state 108. In addition, switching the control system off, as indicated by the arrow 118, transitions the control system from the "ready to dock" state 114 to the "off" state 104.

While the control system is in the "ready to dock" state 114, the user interface may provide an indication to the operator that the haul vehicle is ready to dock. When the operator initiates docking (e.g., via the user interface), as indicated by the arrow 120, the control system transitions to a "docking" state 122. While in the "docking" state 122, the controller instructs the automated speed control system 52 to control the speed of the haul vehicle such that the haul vehicle has sufficient speed to reach the target position. If the operator controls the haul vehicle manually, as indicated by the arrow 124, the control system transitions to the "safe" state 108, thereby disengaging automatic speed control of the haul vehicle. In addition, if a fault is detected (e.g., communication loss, the haul vehicle is unable to reach the target position, a speed range is exceeded, etc.), as indicated by the arrow 126, the control system transitions to an "alarm" state 128. For example, the user interface may present the operator with a visual and/or audible indication that a fault is detected and/or the nature of the fault. As indicated by the arrow 130, the automatic control is disengaged, which transitions the control system to the "safe" state 108. However, if the automatic control is also switched off, as indicated by the arrow 131, the control system transitions to the "off" state 104.

After the haul vehicle reaches the target position for a predetermined time interval, as indicated by the arrow 132, the control system transitions to the "docked" state 134. By way of example, the predetermined time interval may be about 1 second, about 2 seconds, about 3 seconds, about 4 seconds, or more. While in the "docked" state 134, the controller instructs the automated speed control system 52 to control the speed of the haul vehicle such that the haul vehicle has sufficient speed to reach the target position. If the operator controls the haul vehicle manually, as indicated by the arrow 136, the control system transitions to the "safe" state 108, thereby disengaging automatic speed control of the haul vehicle. In addition, if a fault is detected (e.g., communication loss, the haul vehicle is unable to reach the target position, etc.), as indicated by the arrow 138, the control system transitions to an "alarm" state 128. For example, the user interface may present the operator with a visual and/or audible indication that a fault is detected and/or the nature of the fault. As indicated by the arrow 130, the automatic speed control is disengaged, which transitions the control system to the "safe" state 108. However, if the automatic speed control is also switched off, as indicated by the arrow 131, the control system transitions to the "off" state 104.

FIG. 8 is a flow diagram of an embodiment of an exemplary method 140 for controlling an agricultural vehicle, such as the haul vehicle 30. First, as represented by block 142, a first signal indicative of a first determined position and a first determined velocity of a target vehicle (e.g., the agricultural harvester) is received. The first signal may include a measurement of a position of the target vehicle, a speed of the target vehicle, a moment of inertia of the target vehicle, a steering angle of the target vehicle, a heading angle of the target vehicle, a pitch angle of the target vehicle, a roll angle of the target vehicle, a yaw angle of the target vehicle, or a combination of these measurements. The target position and the target speed of the agricultural vehicle may be determined as described in above.

Next, as represented by block 144, after the controller determines the target position and the target speed of the agricultural vehicle, an automated speed control system 52 is instructed to establish a ground speed of the agricultural vehicle sufficient to reach the target position. The position of the agricultural vehicle is then compared to the target position, as represented by block 146. If the target position is reached, the automated speed control system is instructed to maintain the target position and the target velocity, as represented by block 148. Conversely, if the target vehicle is positioned behind, in front of, or generally offset from the agricultural vehicle, the automated speed control system may adjust one or more parameters described above to control the speed the agricultural vehicle to match that of the target position, as represented by block 150. Once the target position is reached, as represented by block 152, the automated speed control system maintains the target position and target velocity, as represented by block 154.

The target position may be determined in part by applying a target lateral offset between the agricultural vehicle and the target vehicle to the first determined position. The target speed may be determined by determining a first radius of curvature of the target vehicle based at least in part on the first determined position and the first determined velocity, determining a second radius of curvature of the agricultural vehicle based at least in part on the first radius of curvature and the target position, determining a determined speed of the target vehicle based at least in part of the first determined velocity, and determining the target speed based at least in part on the determined speed, the first radius of curvature, and the second radius of curvature. The target speed may include multiplying the determined speed by a ratio (e.g., of the second radius of curvature to the first radius of curvature).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for a haul vehicle, comprising:
 a first transceiver configured to receive a signal from a second transceiver, wherein the signal is indicative of a first determined position of a target vehicle and a first determined velocity of the target vehicle; and
 a controller communicatively coupled to the first transceiver, wherein the controller is configured to automatically control the speed of the haul vehicle by:
  determining a target position of the haul vehicle and a target speed of the haul vehicle based at least in part on the first determined position and the first determined velocity;
  determining a first radius of curvature of the target vehicle based at least in part on the first determined position and the first determined velocity;
  determining a second radius of curvature of the haul vehicle based at least in part on the first radius of curvature and the target position;
  instructing an automated speed control system to establish a ground speed of the haul vehicle to reach the target position; and
  instructing the automated speed control system to control the ground speed of the haul vehicle to maintain the target position during docking of the haul vehicle with the target vehicle, while docked, and during turning of both the target vehicle and the haul vehicle, wherein, during turning of both the target vehicle and the haul vehicle, instructing the automated speed control system to control the ground speed of the haul vehicle based at least in part on the first radius of curvature, the second radius of curvature, and the first determined velocity of the target vehicle.

2. The control system of claim 1, wherein the target position is radially offset from the first determined position, laterally offset from the first determined position, longitudinally offset from the first determined position, or a combination thereof, relative to the target vehicle, and the target speed is substantially equal to the first determined velocity.

3. The control system of claim 1, wherein the controller is configured to detect the target vehicle upon reception of the signal by the first transceiver.

4. The control system of claim 1, wherein the first transceiver is configured to broadcast the signal to other vehicles.

5. The control system of claim 1, wherein the signal comprises an indication indicative of at least one parameter defining the position of the target vehicle, a speed of the target vehicle, a measurement of moment of inertia of the target vehicle, a steering angle of the target vehicle, a heading angle of the target vehicle, a pitch angle of the target vehicle, a roll angle of the target vehicle, a yaw angle of the target vehicle, or a combination thereof, and wherein the controller is configured to adjust the target position based on the indication indicative of the at least one parameter.

6. The control system of claim 1, wherein the controller is configured to determine a first speed of the target vehicle and a second speed of the haul vehicle, and to automatically adjust the second speed of the haul vehicle when the first speed varies from the second speed by more than a threshold range.

7. The control system of claim 1, wherein determining the first radius of curvature comprises calculating the first radius of curvature based at least in part on a heading angle and a steer angle of the target vehicle, and wherein determining the second radius of curvature comprises calculating the second radius of curvature based at least in part on a heading angle and a steer angle of the haul vehicle when the haul vehicle and the target vehicle are turning.

8. The control system of claim 1, comprising a user interface communicatively coupled to the controller, wherein the user interface is configured to selectively instruct the controller to automatically control the haul vehicle based on operator input.

9. The control system of claim 8, wherein the controller is configured to adjust the ground speed of the haul vehicle, steering of the haul vehicle, or both, based on input from the user interface.

10. The control system of claim 1, wherein the second transceiver is configured to broadcast a second signal indicative of a second determined position of the target vehicle, a second determined velocity of the target vehicle, or a combination thereof.

11. A control system for an agricultural vehicle, comprising:
 a first transceiver configured to receive a signal from a second transceiver, wherein the signal is indicative of a first determined position of a target vehicle and a first determined velocity of the target vehicle;
 a spatial locating device mounted on a haul vehicle and configured to determine a second determined position and a second determined velocity of the haul vehicle;
 an automated speed control system configured to control a speed of the haul vehicle; and
 a controller communicatively coupled to the first transceiver, to the spatial locating device, and to the automated speed control system, wherein the controller is configured to automatically control the speed of the haul vehicle by:
- determining a target position of the haul vehicle and a target speed of the haul vehicle based at least in part on the first determined position and the first determined velocity;
- determining a first radius of curvature of the target vehicle based at least on the first determined position and the first determined velocity;
- determining a second radius of curvature of the haul vehicle based at least in part on the first radius of curvature and the target position;
- instructing the automated speed control system to establish a ground speed of the haul vehicle to reach the target position; and
- instructing the automated speed control system to control the ground speed of the haul vehicle to maintain the target position during docking of the haul vehicle with the target vehicle, while docked, and during turning of both the target vehicle and the haul vehicle, wherein, during turning of both the target vehicle and the haul vehicle, instructing the automated speed control system to control the ground speed of the haul vehicle based at least in part on the first radius of curvature, the second radius of curvature, and the first determined velocity of the target vehicle.

12. The control system of claim 11, wherein the signal comprises an indication indicative of at least one parameter defining the position of the target vehicle, a speed of the target vehicle, a measurement of moment of inertia of the target vehicle, a steering angle of the target vehicle, a heading angle of the target vehicle, a pitch angle of the target vehicle, a roll angle of the target vehicle, a yaw angle of the target vehicle, or any combination thereof, and wherein the controller is configured to determine the route to the target position of the haul vehicle based at least in part on the indication of the at least one parameter.

13. The control system of claim 11, comprising a user interface communicatively coupled to the controller, wherein the user interface is configured to selectively instruct the controller to automatically control the ground speed of the haul vehicle based on operator input.

14. The control system of claim 11, wherein the controller is configured to determine a difference in speed between the target vehicle and the haul vehicle based on the first radius of curvature and the second radius of curvature, and to automatically control the haul vehicle when the difference in speed is outside of an acceptable speed range.

15. The control system of claim 14, wherein determining the first radius of curvature comprises calculating the first radius of curvature based at least in part on a heading angle and a steer angle of the target vehicle, and wherein determining the second radius of curvature comprises calculating the second radius of curvature based at least in part on a heading angle and a steer angle of the haul vehicle when the agricultural vehicle and the haul vehicle are turning.

16. The control system of claim 11, wherein the controller is configured to adjust a target position and/or speed of the haul vehicle based on input from the user interface.

17. The control system of claim 1, wherein the second transceiver is configured to broadcast a second signal indicative of a second determined position of the target vehicle, a second determined velocity of the target vehicle, or a combination thereof.

18. A method for controlling an agricultural vehicle, comprising:
- receiving a signal indicative of a first determined position of the target vehicle and a first determined velocity of the target vehicle;
- determining a target position of the agricultural vehicle and a target speed of the agricultural vehicle based at least in part on the first determined position and the first determined velocity;
- determining a first radius of curvature of the target vehicle based at least in part on the first determined position and the first determined velocity;
- determining a second radius of curvature of the agricultural vehicle based at least in part on the first radius of curvature and the target position;
- instructing an automated speed control system to establish a ground speed of the agricultural vehicle sufficient to reach the target position; and
- instructing the automated speed control system to control the ground speed of the agricultural vehicle to maintain the target position upon substantially reaching the target position during docking of the agricultural vehicle with the target vehicle, while docked, and during turning of both the target vehicle and the agricultural vehicle, wherein, during turning of both the target vehicle and the agricultural vehicle, instructing the automated speed control system to control the ground speed of the agricultural vehicle is based on the first radius of curvature and the second radius of curvature.

19. The method of claim 16, wherein determining the target position comprises applying a target lateral offset between the agricultural vehicle and the target vehicle to the first determined position.

20. The method of claim 18, wherein determining the target speed of the agricultural vehicle comprises multiplying the first determined velocity by a ratio of the second radius of curvature to the first radius of curvature.

* * * * *